United States Patent
Yokokawa et al.

(10) Patent No.: US 9,118,865 B2
(45) Date of Patent: Aug. 25, 2015

(54) RECEIVING DEVICE, RECEIVING METHOD, PROGRAM, AND RECEIVING SYSTEM

(75) Inventors: Takashi Yokokawa, Kanagawa (JP); Naoki Yoshimochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/005,593

(22) PCT Filed: Apr. 11, 2012

(86) PCT No.: PCT/JP2012/059841
§ 371 (c)(1),
(2), (4) Date: Sep. 17, 2013

(87) PCT Pub. No.: WO2012/144381
PCT Pub. Date: Oct. 26, 2012

(65) Prior Publication Data
US 2014/0009684 A1    Jan. 9, 2014

(30) Foreign Application Priority Data

Apr. 22, 2011 (JP) .................................. 2011-095687

(51) Int. Cl.
*H04N 5/44* (2011.01)
*H04L 27/26* (2006.01)
(Continued)

(52) U.S. Cl.
CPC ............ *H04N 5/4401* (2013.01); *H04L 25/067* (2013.01); *H04L 27/2647* (2013.01); *H04L 27/38* (2013.01)

(58) Field of Classification Search
CPC ... H04L 27/38; H04L 27/2647; H04L 25/067; H04N 5/4401
USPC ......... 375/340, 347, 320, 324, 343, 260, 261, 375/316; 348/720
See application file for complete search history.

(56) References Cited

U.S. PATENT DOCUMENTS 5,852,630 A * 12/1998 Langberg et al. ............. 375/219
7,131,055 B2 * 10/2006 Mathew et al. ............... 714/795
(Continued)

FOREIGN PATENT DOCUMENTS

JP       2006-173724 A    6/2006
WO     WO-2007/037008 A1   4/2007

OTHER PUBLICATIONS

DVB-C2 written standards [Digital Video Broadcasting (DVB); Frame structure channel coding and modulation for a second generation digital transmission system for cable systems (DVB-C2)] DVB Bluebook Document A138, 2010.06, pp. 46-47.
(Continued)

*Primary Examiner* — Shuwang Liu
*Assistant Examiner* — Helene Tayong
(74) *Attorney, Agent, or Firm* — Fishman Stewart Yamaguchi PLLC

(57) ABSTRACT

This technique relates to a receiving device, a receiving method, a program, and a receiving system that are designed to reduce circuit size. A receiving device of one aspect of this technique includes: a de-mapping unit that receives a symbol signal generated by performing mapping on a first branch signal and a second branch signal indicating information about the same transmission target, and performs de-mapping on the symbol signal by a hard decision; a selecting unit that selects, in accordance with a reception state, one signal from the first branch signal and the second branch signal obtained through the de-mapping; and a decoding unit that decodes the information about the transmission target based on the one signal. This technique can be applied to receivers that receive OFDM signals compliant with DVB-C2.

15 Claims, 10 Drawing Sheets

(51) Int. Cl.
*H04L 25/06* (2006.01)
*H04L 27/38* (2006.01)

(56) References Cited

U.S. PATENT DOCUMENTS

| | | | |
|---|---|---|---|
| 2007/0071150 A1* | 3/2007 | Yang et al. | 375/347 |
| 2010/0135422 A1* | 6/2010 | Lee et al. | 375/260 |
| 2010/0169734 A1* | 7/2010 | Gamage et al. | 714/752 |
| 2012/0128101 A1* | 5/2012 | Chen et al. | 375/320 |
| 2012/0269201 A1* | 10/2012 | Atungsiri et al. | 370/474 |
| 2014/0133592 A1* | 5/2014 | Ko et al. | 375/261 |

OTHER PUBLICATIONS

DVB-C2 implementation guideline [Digital Video Broadcasting (DVB); Implementation Guidelines for a second generation digital cable transmission system (DVB-C2)] ETSI TS 102 991 v1.1.2.
International Search Report; International Application No. PCT/JP2012/059841; Filed: Apr. 11, 2012; Mailing Date of the International Search Report: Jul. 17, 2012 (Form PCT/ISA/210).
Written Opinion of the International Searching Authority; International Application No. PCT/JP2012/059841; International Filing Date: Apr. 11, 2012; Dated: Jul. 17, 2012. (Form PCT/ISA/220 and PCT/ISA/237).

* cited by examiner

RECEIVING DEVICE, RECEIVING METHOD, PROGRAM, AND RECEIVING SYSTEM

TECHNICAL FIELD

This technique relates particularly to a receiving device, a receiving method, a program, and a receiving system that are designed to reduce circuit size.

BACKGROUND ART

DVB-C2 (Digital Video Broadcasting for Cable 2) is a second-generation digital cable broadcasting standard in Europe (Non-Patent Document 1).

On the transmission side of a transmission system compliant with DVB-C2, signals of a Header portion are generated by performing mapping after copies of the same information are made. Headers specified in DVB-C2 include Robust Headers and High Efficiency Headers, which use different modulation methods.

FIG. 1 is a diagram showing a method of generating a Robust Header. Sixteen signaling bits (information) to be transmitted as a Header portion are input to a generating unit that generates Robust Header signals.

An RM (32, 16) encoder 11 performs RM encoding on the 16 signaling bits of the Header portion, and outputs a 32-bit RM code word. The RM code word is then copied and divided into an upper branch and a lower branch.

In the lower branch, the RM code word that is output from the RM (32, 16) encoder 11 is input to a cyclic shifting unit 12. The cyclic shifting unit 12 cyclically shifts each of the input bits, and outputs each of the resultant bits. Where the respective bits that are input to the cyclic shifting unit 12 are bit0, bit1, bit2, . . . , and bit31 in the order of input, the cyclic shifting unit 12 outputs bit30, bit31, bit0, bit1, bit2, . . . , and bit29 in this order.

A scrambling unit 13 subjects each of the bits output from the cyclic shifting unit 12 to an exclusive-OR operation with a 32-bit sequence defined in the standard, and outputs the operation result as a RM code word from the lower branch to a QPSK mapper 14.

Based on the RM code word from the upper branch and the RM code word from the lower branch, the QPSK mapper 14 performs QPSK mapping as specified in the standard, and outputs a Robust Header formed with 32 QPSK symbols.

FIG. 2 is a diagram showing a method of generating a High Efficiency Header. Of the components shown in FIG. 2, the same components as those in FIG. 1 are denoted by the same reference numerals as those in FIG. 1. Sixteen signaling bits to be transmitted as a Header portion are input to a generating unit that generates High Efficiency Header signals.

An RM (32, 16) encoder 11 performs RM encoding on the 16 signaling bits of the Header portion, and outputs a 32-bit RM code word. The RM code word is then copied and divided into an upper branch and a lower branch.

In the lower branch, the RM code word that is output from the RM (32, 16) encoder 11 is input to a cyclic shifting unit 12. The cyclic shifting unit 12 cyclically shifts each of the input bits, and outputs each of the resultant bits. Where the respective bits that are input to the cyclic shifting unit 12 are bit0, bit1, bit2, . . . , and bit31 in the order of input, the cyclic shifting unit 12 outputs bit30, bit31, bit0, bit1, bit2, . . . , and bit29 in this order.

A scrambling unit 13 subjects each of the bits output from the cyclic shifting unit 12 to an exclusive-OR operation with a 32-bit sequence defined in the standard, and outputs the operation result as a RM code word from the lower branch to a 16-QAM mapper 21.

Based on the RM code word from the upper branch and the RM code word from the lower branch, the 16-QAM mapper 21 performs 16-QAM mapping as specified in the standard, and outputs a High Efficiency Header formed with sixteen 16-QAM symbols.

According to DVB-C2, those Headers are used as Preamble Headers and FEC Frame Headers. Only Robust Headers are used as Preamble Headers, and Robust Headers or High Efficiency Headers are used as FEC Frame Headers.

A receiver is able to determine the position of a Preamble Header from absolute frequency. The only role of a Preamble Header is to transmit 16 signaling bits.

Meanwhile, the position of an FEC Frame Header can be determined from either absolute frequency or L1 signaling part 2 (L1 information), which is transmission control information. An FEC Frame Header is used by a receiver not only to transmit 16 signaling bits but also to detect the position of an FEC Frame.

FIG. 3 is a diagram showing the structure of a receiver specified in the Implementation Guidelines (Non-Patent Document 2). FIG. 3 shows a structure that receives Robust Headers.

A QPSK de-mapper 31 receives the 32 QPSK symbols of a Header portion that are sequentially input, and performs soft-decision de-mapping. The QPSK de-mapper 31 divides the bits of a predetermined width obtained through the soft-decision de-mapping into an upper branch and a lower branch, and outputs the resultant bits.

In the lower branch, a descrambling unit 32 subjects the output of the QPSK de-mapper 31 to an exclusive-OR operation with a 32-bit sequence that is defined in the standard and is the same as the sequence used on the transmission side, and outputs the operation result.

The respective bits that are output from the descrambling unit 32 are input to a cyclic shifting unit 33. The cyclic shifting unit 33 cyclically shifts each of the input bits in the reverse order of the order in which cyclic shifting has been performed on the transmission side, and outputs each of the resultant bits. Where the respective bits that are input to the cyclic shifting unit 33 are bit30, bit31, bit0, bit1, bit2, and bit29 in the order of input, the cyclic shifting unit 33 outputs bit0, bit1, bit2, . . . , and bit31 in this order.

A combining unit 34 combines the upper-branch bits with the lower-branch bits supplied from the cyclic shifting unit 33, and outputs the combination result. According to the Implementation Guidelines, a maximum capacity can be achieved when the combining is performed with an output of a soft-decision de-mapper.

An RM decoder 35 performs RM decoding on the output of the combining unit 34, and outputs 16-bit signaling data.

FIG. 4 is a block diagram specifically showing the structure shown in FIG. 3. Of the components shown in FIG. 4, the same components as those in FIG. 3 are denoted by the same reference numerals as those in FIG. 3.

A controller 41 generates a signal uen0 that is a control signal (EN) for a flip-flop 42, and a signal uen1 that is a control signal for a flip-flop 43. The controller 41 also generates a signal len0 that is a control signal for a flip-flop 44, and a signal len1 that is a control signal for a flip-flop 45. The controller 41 generates a signal lsel that is a select signal for a selector 46, and a signal den that is a control signal for flip-flops 51-0 through 51-30.

The QPSK de-mapper 31 receives the 32 QPSK symbols of a Header portion that are sequentially input, and information indicating the 32 reception states of those symbols, and performs soft-decision de-mapping on the QPSK symbols based on the reception states. The QPSK de-mapper 31 divides the bits obtained through the soft-decision de-mapping into an upper branch and a lower branch, and outputs the resultant bits. The bit width of the output of the QPSK de-mapper 31 is represented by n.

In the upper branch, the flip-flops 42 and 43, which are flip-flops with EN, delay the output of the QPSK de-mapper 31 in accordance with the signals uen0 and uen1 generated by the controller 41. The output of the QPSK de-mapper 31 delayed by the flip-flop 43 is supplied to the combining unit 34.

In the lower branch, the descrambling unit 32 subjects the bits supplied from the QPSK de-mapper 31 to an exclusive-OR operation with a 32-bit sequence that is defined in the standard and is the same as the sequence used on the transmission side, and outputs the operation result.

The respective bits that are output from the descrambling unit 32 are supplied to the selector 46 and the flip-flops 44 and 45. The flip-flops 44 and 45 store the output of the descrambling unit 32, and supply the output to the selector 46 in accordance with the signals len0 and len1 generated by the controller 41.

The selector 46 selects the output of the descrambling unit 32 when the signal lsel generated by the controller 41 is 0, selects the output of the flip-flop 44 when the signal lsel is 1, and selects the output of the flip-flop 45 when the signal lsel is 2. The bits selected by the selector 46 are supplied as the lower-branch bits to the combining unit 34.

Where the respective bits that are output from the descrambling unit 32 are bit30, bit31, bit0, bit1, bit2, . . . , and bit29 in the order of output, the selector 46 outputs bit0, bit1, bit2, . . . , and bit31 in this order. The timing for the first bit bit0 to be output from the selector 46 and the timing for the third bit bit0 to be output from the flip-flop 43 are the same.

The combining unit 34 combines the upper-branch bits, which are the output of the flip-flop 43, with the lower-branch bits, which are the output of the selector 46, and outputs the combination result. The bit width of the output of the combining unit 34 is (n+1) bits.

The output of the combining unit 34 is supplied as symbol31 to the RM decoder 35, and is sequentially stored into the flip-flops 51-0 through 51-30, which are 31 flip-flops with EN. The output of the combining unit 34 stored in the flip-flops 51-0 through 51-30 is output as symbol0 through symbol30 to the RM decoder 35 in accordance with the signal den generated by the controller 41.

The RM decoder 35 performs RM decoding on the information equivalent to the 32 symbols formed with the outputs of the flip-flops 51-0 through 51-30, which are the 31 flip-flops, and the output of the combining unit 34, and then outputs 16-bit signaling data.

CITATION LIST

Non-Patent Documents

Non-Patent Document 1: DVB-C2 written standards [Digital Video Broadcasting (DVB); Frame structure channel coding and modulation for a second generation digital transmission system for cable systems (DVB-C2)] DVB Document A138
Non-Patent Document 2: DVB-C2 implementation guideline [Digital Video Broadcasting (DVB); Implementation Guidelines for a second generation digital cable transmission system (DVB-C2)] ETSI TS 102 991 v1.1.2

SUMMARY OF THE INVENTION

Problems to be Solved by the Invention

In a case where the structure shown in FIG. 4 is used, the number of flip-flops increases with the bit width of the output of the QPSK de-mapper 31 that performs soft-decision de-mapping.

Also, since an arithmetic operation needs to be performed on a (n+1)-bit input, the processing capacity the RM decoder 35 is required to have increases with the bit width of the output of the QPSK de-mapper 31.

This technique has been developed in view of those circumstances, and is to reduce circuit size in a case where signals generated by performing mapping after copies of the same information are made are received.

Solutions to Problems

A receiving device of one aspect of this technique includes: a de-mapping unit that receives a symbol signal generated by performing mapping on a first branch signal and a second branch signal indicating information about the same transmission target, and performs de-mapping on the symbol signal by a hard decision; a selecting unit that selects, in accordance with a reception state, one signal from the first branch signal and the second branch signal obtained through the de-mapping; and a decoding unit that decodes the information about the transmission target based on the one signal.

The receiving device may be a single IC chip, or may be a component including an IC chip, or may be a device formed with components including an IC chip.

The selecting unit can be made to select the signal in the better reception state between the first branch signal and the second branch signal based on the information indicating the reception state of the symbol signal.

The symbol signal may be a signal of an FEC Frame Header or a Preamble Header compliant with DVB-C2.

In the transmitting device that transmits the symbol signal, cyclic shifting is performed on the second branch signal. The receiving device may further include a cyclic shifting unit that performs cyclic shifting on the second branch signal obtained through the de-mapping in the reverse order of the cyclic shifting order in the transmitting device. In this case, the selecting unit can be made to select the one signal from the second branch signal indicating predetermined bits excluding a bit located in a predetermined region starting from the top in the sequence after the cyclic shifting performed by the cyclic shifting unit, and the first branch signal indicating the predetermined bits, the predetermined bits being of the bits indicated by the second signal obtained through the de-mapping.

The selecting unit can be made to select the first branch signal as the one signal indicating the bit located in the predetermined region.

The symbol signal may be a signal of an FEC Frame Header compliant with DVB-C2, and the selecting unit can be made to select the one signal from the first branch signal and the second branch signal indicating the predetermined bits before the position of the FEC Frame Header is detected, and select the one signal from the first branch signal and the second branch signal indicating all the bits after the position of the FEC Frame Header is detected.

In the one aspect of this technique, a symbol signal generated by performing mapping on a first branch signal and a second branch signal indicating information about the same transmission target is received, and de-mapping is performed on the symbol signal by a hard decision. In accordance with a reception state, one signal is selected from the first branch signal and the second branch signal obtained through the de-mapping. The information about the transmission target is then decoded based on the one signal.

Effects of the Invention

According to this technique, circuit size can be reduced.

MODES FOR CARRYING OUT THE INVENTION

Figure 5:
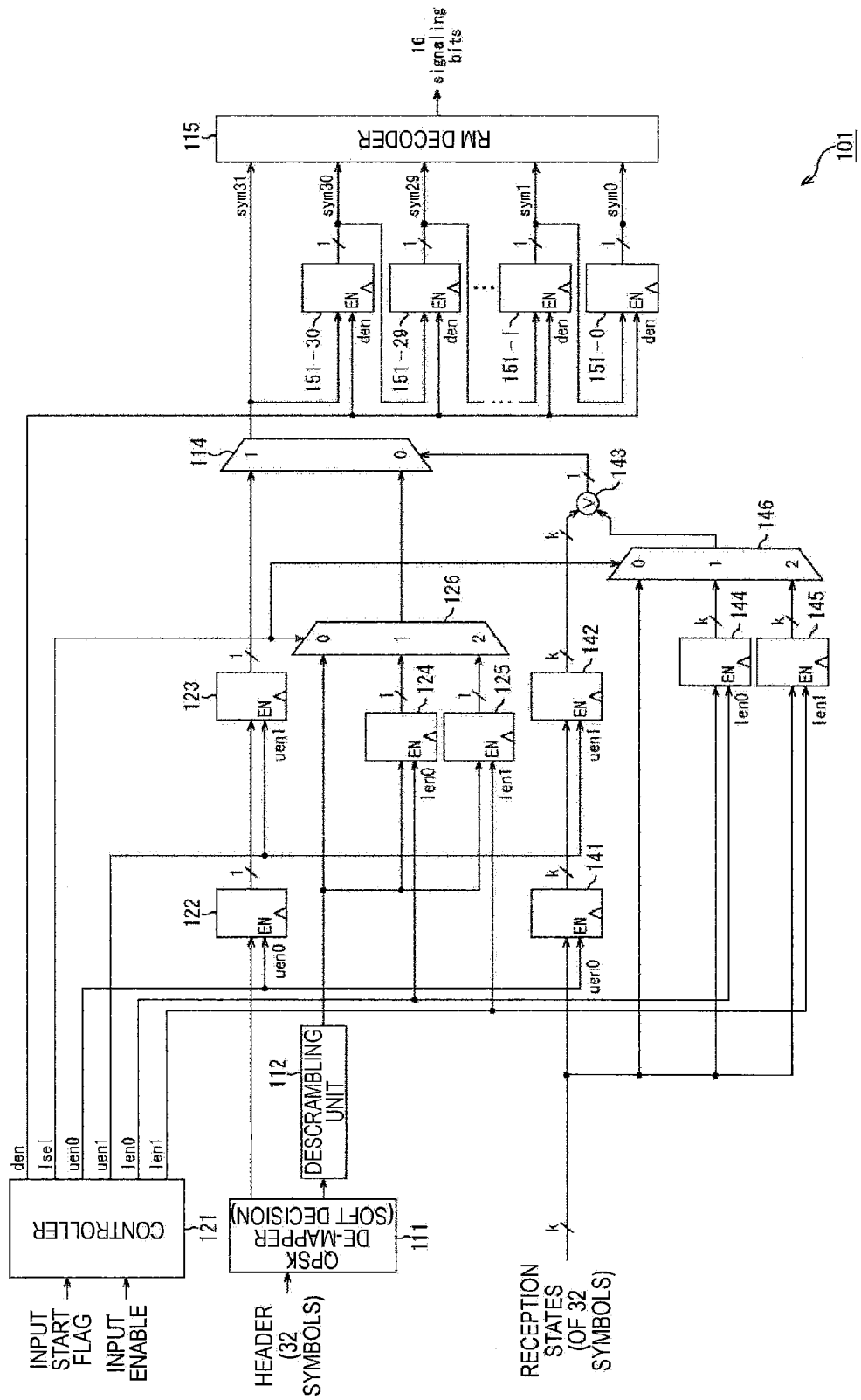
FIG. 5 is a diagram showing an example structure of a Header processing unit formed in a receiving device according to an embodiment of this technique.

The following is a description of embodiments for carrying out the present technique. Explanation will be made in the following order.
1. First embodiment (a case where positions of Headers have been detected)
2. Second Embodiment (a case where positions of Headers have not been detected)
3. Third Embodiment (an example of Header process switching)
4. Modifications First Embodiment FIG. 5 is a diagram showing an example structure of a Header processing unit formed in a receiving device according to an embodiment of this technique.
The receiving device includes a demodulating unit that receives signals compliant with DVB-C2 and performs demodulation, an error correcting unit that performs error correction, and the like. The Header processing unit 101 shown in FIG. 5 is placed in a position in a stage that is after the demodulating unit but is before the error correcting unit.
The QPSK symbols of a Header portion output from the demodulating unit, and information that indicates the reception states of the respective QPSK symbols and has a bit width k are input to the Header processing unit 101. The reception state of each QPSK symbol is indicated by CSI (Channel State Information), for example. The QPSK symbols that are input to the Header processing unit 101 are signals that are generated by copying and dividing a signal of a transmission target Header portion into upper-branch signals and lower-branch signals, and then performing mapping in the device on the transmission side.

In the Header processing unit 101, a hard-decision de-mapper is used in de-mapping of the symbols forming a Header. Where the required CNR is approximately 10 dB, the information prior to the mapping on the transmission side can be correctly obtained by a hard-decision de-mapper. The combination with the lowest required CNR (Carrier Power to Noise Power Ratio) among the combinations of a modulation method used according to DVB-C2 and a coded rate is a combination of a 16-QAM modulation method and a coded rate of 4/5.

After the hard-decision de-mapping, the upper-branch bits or the lower-branch bits are selected as the RM decoding target based on reception states. As a hard-decision de-mapper is used in de-mapping of the symbols, and a branch is selected based on the reception states, circuit size can be reduced without performance degradation.

The positions of Headers have been detected in this example. Specifically, the Header to be processed at the Header processing unit 101 is a Preamble Header or an FEC Frame Header having its position detected. The position of a Preamble Header can be determined from absolute frequency, as described above. The position of an FEC Frame Header is determined by comparing respective bits, as will be described later.

A controller 121 shown in FIG. 5 generates control signals (EN) and a select signal based on an input enable signal and an input start flag that is input from the demodulating unit, for example, and indicates the timing to input the processing target Header.

The controller 121 generates a signal uen0 that is a control signal for flip-flops 122 and 141, and a signal uen1 that is a control signal for flip-flops 123 and 142. The controller 121 also generates a signal len0 that is a control signal for flip-flops 124 and 144, and a signal len1 that is a control signal for flip-flops 125 and 145. The controller 121 generates a signal lsel that is a select signal for selectors 126 and 146, and a signal den that is a control signal for flip-flops 151-0 through 151-30.

A QPSK de-mapper 111 receives the 32 QPSK symbols of the Header portion that are sequentially input, and performs hard-decision de-mapping on the QPSK symbols. The QPSK de-mapper 111 divides the bits obtained through the hard-decision de-mapping into the upper branch and the lower branch, and outputs the resultant bits. The bit width of the output of the QPSK de-mapper 111 is 1.

In the upper branch of the output of the QPSK de-mapper 111, the flip-flops 122 and 123, which are flip-flops with EN, delay the output of the QPSK de-mapper 111 in accordance with the signals uen0 and uen1 generated by the controller 121. The output of the QPSK de-mapper 111 delayed by the flip-flop 123 is supplied to a selector 114.

In the lower branch of the output of the QPSK de-mapper 111, a descrambling unit 112 subjects the bits supplied from the QPSK de-mapper 111 to an exclusive-OR operation with a 32-bit sequence that is defined in the standard and is the same as the sequence used on the transmission side, and outputs the operation result.

The respective bits that are output from the descrambling unit 112 are supplied to the selector 126 and the flip-flops 124 and 125. The flip-flops 124 and 125 store the output of the descrambling unit 112, and supply the output to the selector 126 in accordance with the signals len0 and len1 generated by the controller 121.

The selector 126 selects the output of the descrambling unit 112 when the signal lsel generated by the controller 121 is 0, selects the output of the flip-flop 124 when the signal lsel is 1, and selects the output of the flip-flop 125 when the signal lsel is 2. The bits selected by the selector 126 are supplied as the lower-branch bits to the selector 114.

Where the respective bits that are output from the descrambling unit 112 are bit30, bit31, bit0, bit1, bit2, ..., and bit29 in the order of output, the selector 126 outputs bit0, bit1, bit2, ..., and bit31 in this order. The timing for the first bit bit0 to be output from the selector 126 and the timing for the third bit bit0 to be output from the flip-flop 123 are the same.

Meanwhile, the information indicating reception states is divided into the upper branch and the lower branch, and are input to the flip-flop 141, which forms the upper branch, and to the flip-flops 144 and 145 and the selector 146, which form the lower branch.

In the upper branch of the information indicating reception states, the flip-flops 141 and 142, which are flip-flops with EN, delay the information indicating reception states in accordance with the signals uen0 and uen1 generated by the controller 121. The information indicating reception states delayed by the flip-flop 142 is supplied to a comparing unit 143.

In the lower branch of the information indicating reception states, the flip-flops 144 and 145 store the information indicating reception states, and outputs the information to the selector 146 in accordance with the signals len0 and len1 generated by the controller 121.

The selector 146 selects the information indicating reception states that are input from outside when the signal lsel generated by the controller 121 is 0, selects the output of the flip-flop 144 when the signal lsel is 1, and selects the output of the flip-flop 145 when the signal lsel is 2. The information indicating reception states that are selected by the selector 146 is supplied as the information indicating the reception state of the lower branch to the comparing unit 143.

Where the input information indicating the reception state are state30, state31, state0, state1, state2, ..., and state29 in the order of input, the selector 146 outputs state0, state1, state2, ..., and state31 in this order. The timing for the first reception state information state0 to be output from the selector 146 and the timing for the third reception state information state0 to be output from the flip-flop 142 are the same.

The comparing unit 143 compares the information indicating the reception state of the upper branch, which is the output of the flip-flop 142, with the information indicating the reception state of the lower branch, which is the output of the selector 146. The comparing unit 143 outputs the value of 1 when the information indicating the reception state of the upper branch is greater (or when the reception state of the upper branch is better), and outputs the value of 0 in any other cases.

The selector 114 selects the output of the flip-flop 123 or the output of the selector 126 based on the value output from the comparing unit 143.

When the value of 1 is supplied from the comparing unit 143, or when the reception state of the upper branch is better, the selector 114 selects the output of the flip-flop 123. When the value of 0 is supplied from the comparing unit 143, or when the reception state of the lower branch is better, the selector 114 selects the output of the selector 126.

The output of the selector 114 is supplied as symbol31 to an RM decoder 115, and is sequentially stored into the flip-flops 151-0 through 151-30, which are 31 flip-flops with EN. The output of the selector 114 stored in the flip-flops 151-0 through 151-30 is output as symbol0 through symbol30 to the RM decoder 115 in accordance with the signal den generated by the controller 121.

The RM decoder 115 performs RM decoding on the information equivalent to the 32 symbols formed with the outputs of the flip-flops 151-0 through 151-30, which are the 31 flip-flops, and the output of the selector 114, and then outputs 16-bit signaling data.

As a hard-decision de-mapper is used in de-mapping of symbols, and the output of the de-mapper is one bit, the number of flip-flops can be made smaller than that in a case where a soft-decision de-mapper is used. Also, each input to the RM decoder 115 can be one bit, and the RM decoder 115 can be formed only with bit operations.

Figure 1:
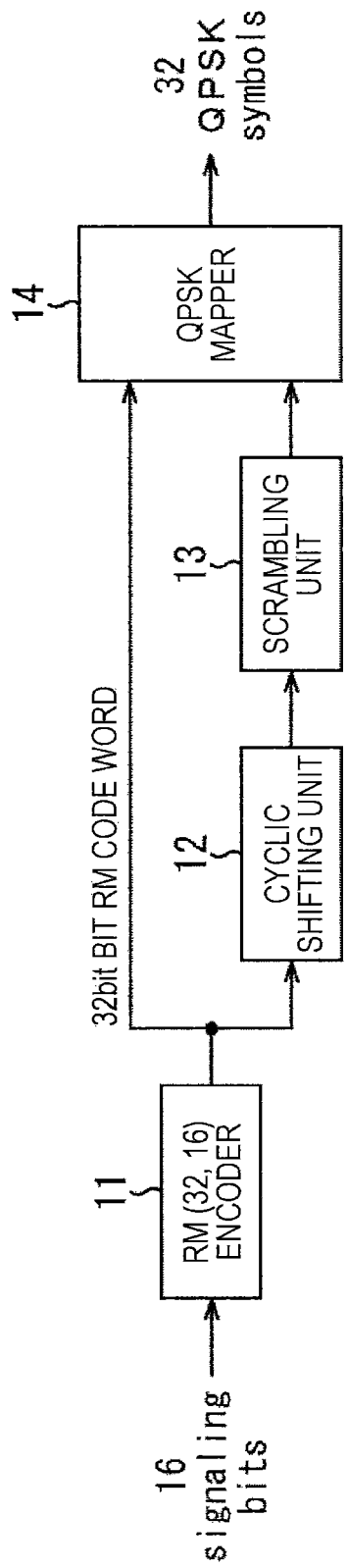
FIG. 1 is a diagram showing a method of generating a Robust Header.
Figure 2:
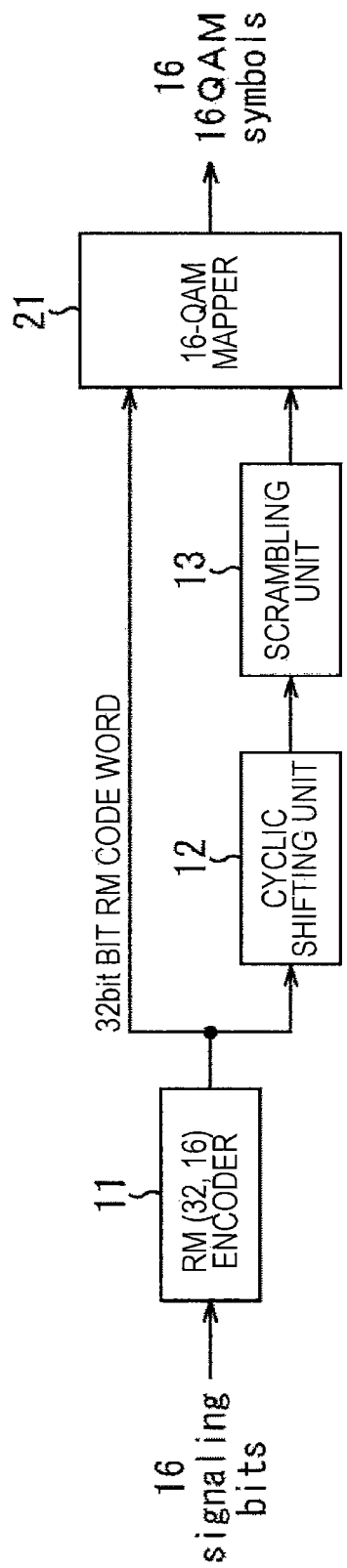
FIG. 2 is a diagram showing a method of generating a High Efficiency Header.
Figure 3:
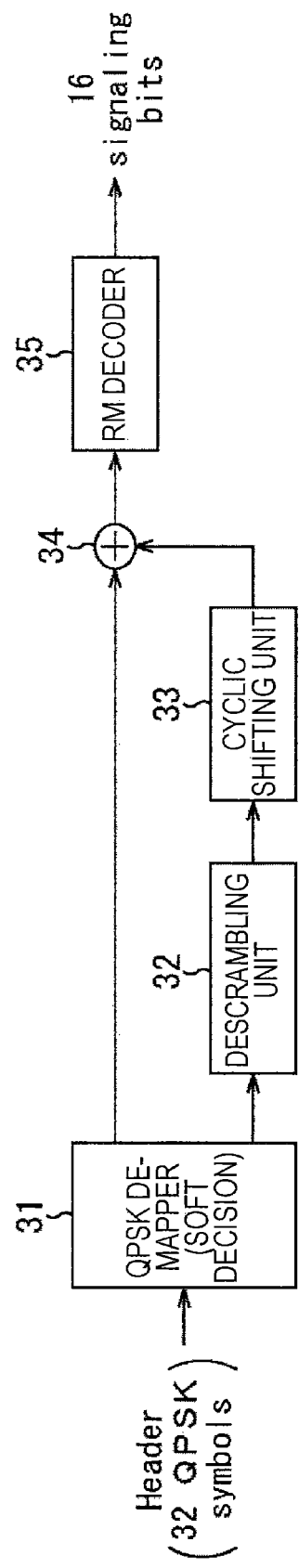
FIG. 3 is a diagram showing the structure of a receiver specified in the Implementation Guidelines.
Figure 4:
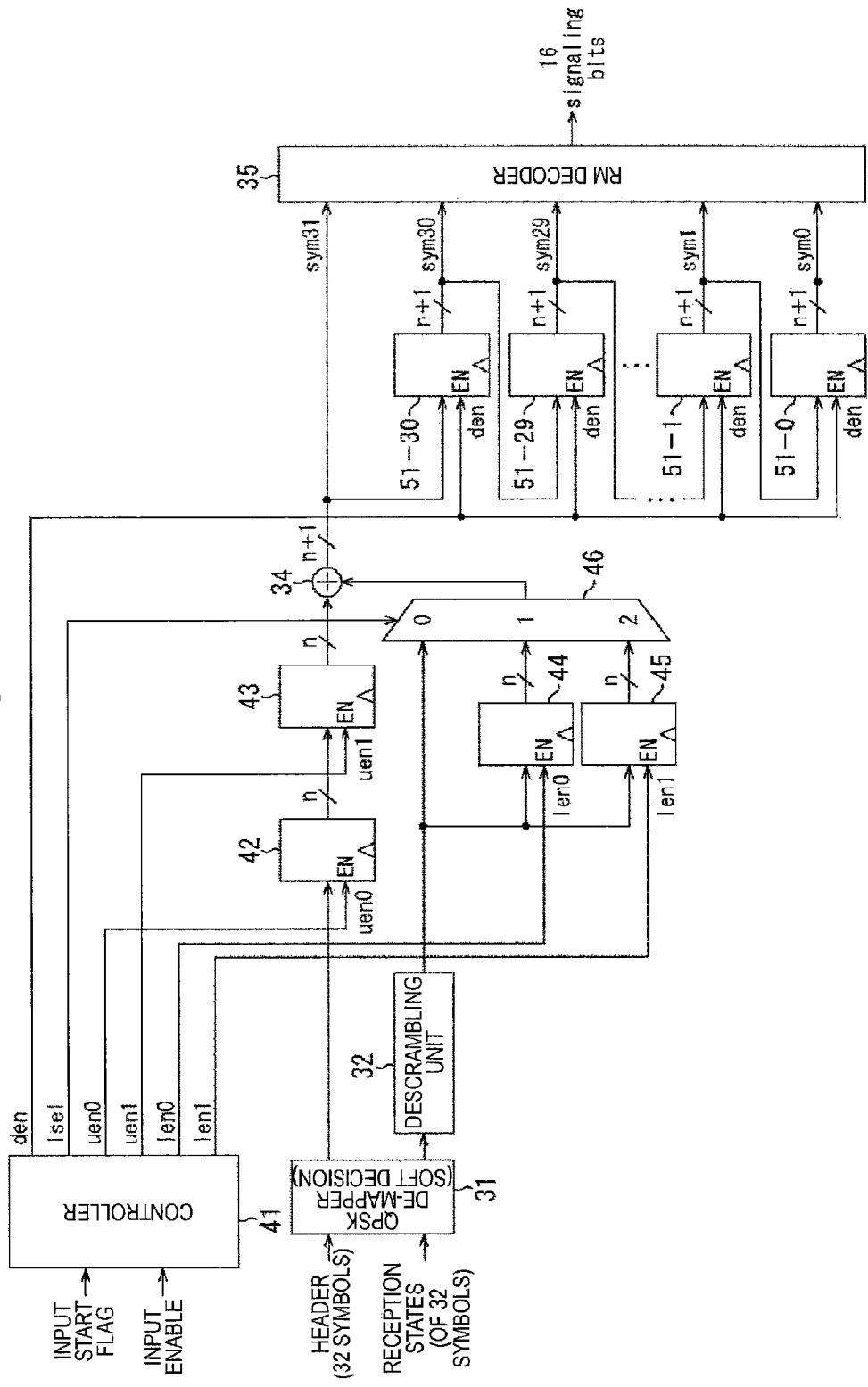
FIG. 4 is a detail view of the structure shown in FIG. 3.

As the output of the hard-decision de-mapper is divided into the upper branch and the lower branch, and the one in the better reception state is selected for each bit, almost the same decoding error occurrence probability as that in a case where the combining unit specified in the Implementation Guidelines (the combining unit 34 shown in FIG. 4) is used can be realized.

Second Embodiment

Concept of Processing in the Header Processing Unit

To perform processing at the Header processing unit 101 shown in FIG. 5, the positions of Headers need to have been detected. In a case where the processing target Header is an FEC Frame Header, the position of the FEC Frame Header is not detected until synchronization is established.

While the position of the FEC Frame Header has not been detected, a hard-decision de-mapper is used in de-mapping of symbols as described above, and the reception states of the upper-branch bits and the reception states of the lower-branch bits are compared with each other so as to select bits. Such a case is now described.

Figure 6:
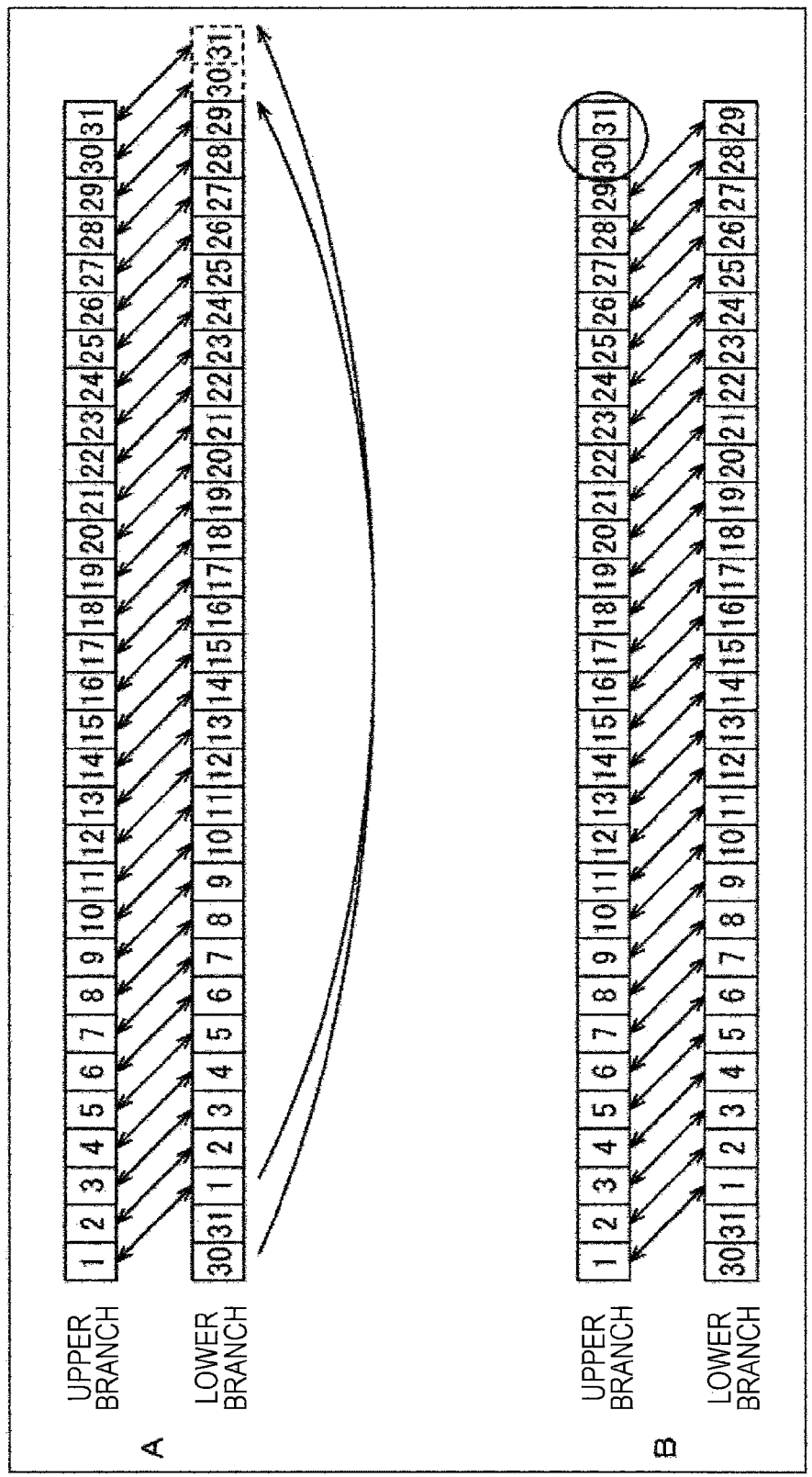
FIG. 6 is a diagram showing the concept of processing at the Header processing unit.

In this case, each of the reception states of the first bit bit30 and the second bit bit31 of the lower branch is delayed by 31 bits, and the reception states of the 32 bits of the upper branch need to be compared with those of the lower branch bit by bit, as shown in A in FIG. 6. Where such processing is performed, the number of flip-flops or the memory for delaying the information indicating reception states is extremely large.

As shown in B in FIG. 6, the first and second bits of the lower branch are not subjected to the reception state comparison, and only the 30 bits of bit1 through bit29, which do not need to be greatly delayed for cyclic shifting, are subjected to the reception state comparison. In this manner, the above problem can be avoided.

As for bit1 through bit29, the reception state of each of the bits of the upper branch is compared with the corresponding one of the lower branch, and the one in the better reception state is selected as a decoding target. The reception states of bit30 and bit31 are not subjected to the reception state comparison, and bit30 and bit31 of the upper branch are selected as decoding targets, as indicated by a circle in B in FIG. 6. The lower-branch bit30 and bit31 are in the first 2-bit range when cyclic shifting is performed in the reverse order of the order in which cyclic shifting has been performed on the transmission side, and the reception states of those bits are greatly delayed when compared with the reception states of the upper-branch bit30 and bit31.

[Example Structure of a Header Processing Unit]

Figure 7:
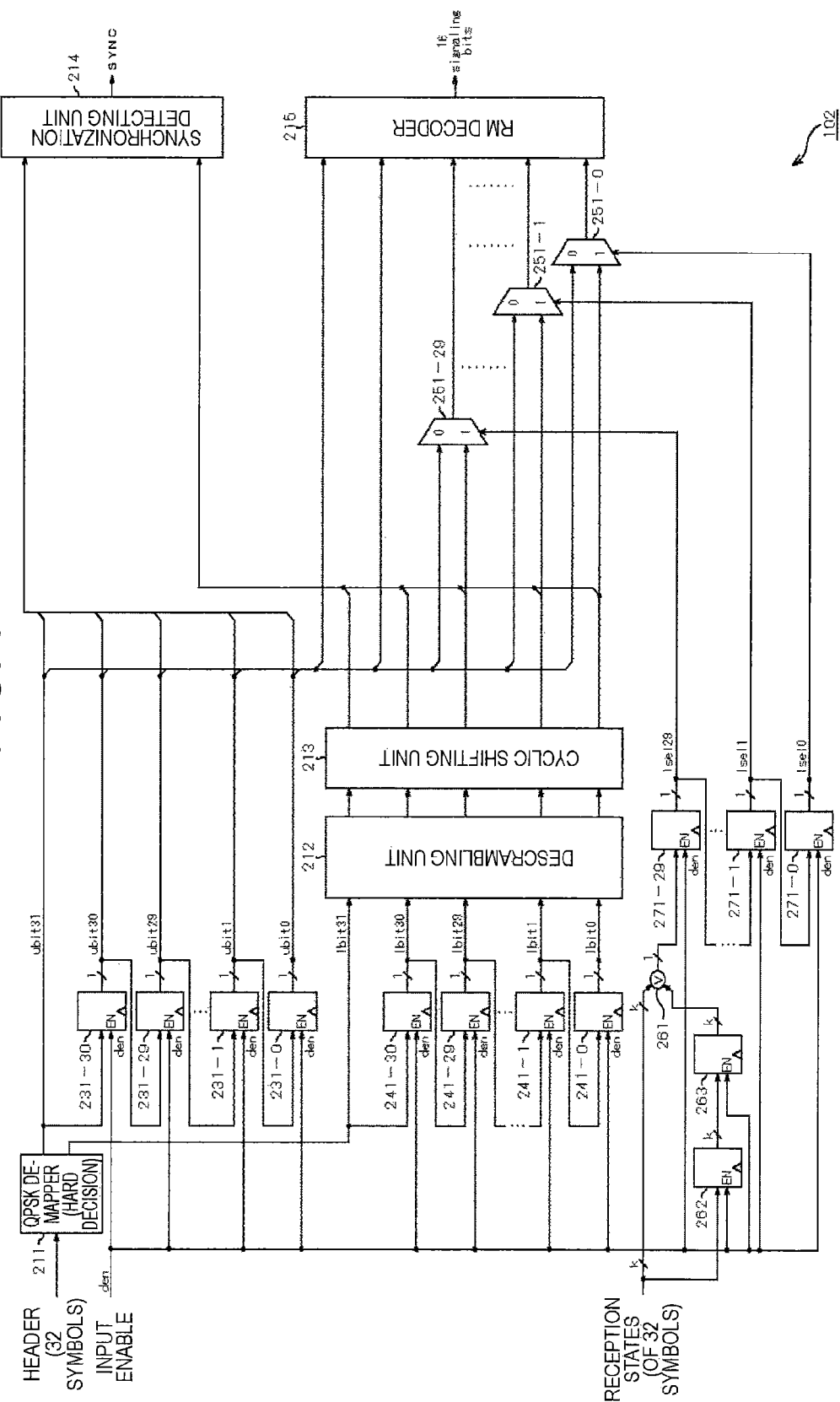
FIG. 7 is a diagram showing another example structure of a Header processing unit.

FIG. 7 is a diagram showing an example structure of a Header processing unit that compares reception states as shown in B in FIG. 6 and selects decoding target bits in a case where the position of an FEC Frame Header has not been detected.

The processing target Header of the Header processing unit 102 shown in FIG. 7 is an FEC Frame Header, and QPSK is selected as the Header modulation method. QPSK symbols that are output from the demodulating unit in the previous stage, and information that indicates the reception states of the respective QPSK symbols and has a bit width k are input to the Header processing unit 102. A signal den that is input as an input enable signal from the demodulating unit is input to the Header processing unit 102.

A QPSK de-mapper 211 receives the 32 QPSK symbols that are sequentially input, and performs hard-decision de-mapping on the QPSK symbols. The QPSK de-mapper 211 divides the bits obtained through the hard-decision de-mapping into an upper branch and a lower branch, and outputs the resultant bits. The bit width of the output of the QPSK de-mapper 211 is 1.

In the upper branch of the output of the QPSK de-mapper 211, the output of the QPSK de-mapper 211 is supplied as ubit31 to a synchronization detecting unit 214 and an RM decoder 215, and is sequentially stored into flip-flops 231-0 through 231-30 that are 31 flip-flops with EN. The output of the QPSK de-mapper 211 stored in the flip-flops 231-0 through 231-30 is output as ubit0 through ubit30 to the synchronization detecting unit 214 in accordance with the signal den.

Of the output of the QPSK de-mapper 211 stored in the flip-flops 231-0 through 231-30, the output of the QPSK de-mapper 211 stored in the flip-flop 231-30 is output as ubit30 directly to the RM decoder 215. As described above, at the Header processing unit 102, the reception state of each of the bits bit1 through bit29 of the upper branch is compared with the corresponding one of the lower branch, and the one in the better reception state is selected as a decoding target. However, the bits bit30 and bit31 are not subjected to the reception state comparison, and bit30 and bit31 of the upper branch are selected as decoding targets.

The output of the QPSK de-mapper 211 stored in the flip-flops 231-0 through 231-29 is output as ubit0 through ubit29 to selectors 251-0 through 251-29, respectively, which are provided in the stage before the RM decoder 215.

In the lower branch of the output of the QPSK de-mapper 211, the output of the QPSK de-mapper 211 is supplied as lbit31 to a descrambling unit 212, and is sequentially stored into flip-flops 241-0 through 241-30 that are 31 flip-flops with EN. The output of the QPSK de-mapper 211 stored in the flip-flops 241-0 through 241-30 is output as lbit0 through lbit30 to the descrambling unit 212 in accordance with the signal den.

The descrambling unit 212 subjects the 32 bits consisting of lbit31 supplied from the QPSK de-mapper 211 and lbit0 through lbit30 supplied from the flip-flops 241-0 through 241-30 to an exclusive-OR operation with a 32-bit sequence that is defined in the standard and is the same as the sequence used on the transmission side, and outputs the operation result.

A cyclic shifting unit 213 cyclically shifts the 32 bits output from the descrambling unit 212 in the reverse order of the order in which cyclic shifting has been performed on the transmission side. The cyclic shifting unit 213 outputs the 32 bits consisting of lbit0 through lbit31 obtained through the cyclic shifting to the synchronization detecting unit 214 and the selectors 251-0 through 251-29 provided in the stage before the RM decoder 215.

The synchronization detecting unit 214 performs matching on the sequence of ubit0 through ubit31 of the upper branch and the sequence of lbit0 through lbit31 of the lower branch, and determines whether the two sequences are identical. In a case where the 32-bit sequence of ubit0 through ubit31 and the 32-bit sequence of lbit0 through lbit31 are obtained by performing hard-decision de-mapping on the symbols of the FEC Frame Header, those sequences are identical except for when there is a disturbance.

When a predetermined number or more of the bits are identical, the synchronization detecting unit 214 outputs a synchronization signal sync indicating that the FEC Frame Header has been detected. As a result, the position of the FEC Frame Header is detected, and the symbols of the Header portion can be processed at the Header processing unit 101 shown in FIG. 5.

Meanwhile, the information indicating reception states is supplied to a comparing unit 261 and a flip-flop 262 that is a flip-flop with EN. The flip-flop 262 and a flip-flop 263 in the stage after the flip-flop 262 each delay the information indicating reception states in accordance with the signal den, and outputs the delayed information. The output of the flip-flop 263 is supplied to the comparing unit 261.

Where the input information indicating reception states is state30, state31, state0, state1, state2, and state29 in the order of input, the timing for state0 to be input directly from outside and the timing for state0 to be input from the flip-flop 263 to the comparing unit 261 are the same.

The comparing unit 261 compares the reception state information supplied directly from outside with the reception state information supplied from the flip-flop 263. The comparing unit 261 outputs the value of 1 when the reception state information supplied directly from outside is greater (or when the reception state of the lower branch is better).

The output of the comparing unit 261 is sequentially stored into flip-flops 271-0 through 271-29 that are 30 flip-flops with EN. The output of the comparing unit 261 stored in the flip-flops 271-0 through 271-29 are output as signals lsel0 through lsel29 to the selectors 251-0 through 251-29 in accordance with the signal den.

When the signal lsel0 supplied from the flip-flop 271-0 indicates the value of 1, the selector 251-0 selects the 0th bit of the 32 bits supplied from the cyclic shifting unit 213 of the lower branch. When the signal lsel0 indicates the value of 0, on the other hand, the selector 251-0 selects ubit0 supplied from the flip-flop 231-0 of the upper branch.

When the signal lsel1 supplied from the flip-flop 271-1 indicates the value of 1, the selector 251-1 selects the first bit of the 32 bits supplied from the cyclic shifting unit 213 of the lower branch. When the signal lsel1 indicates the value of 0, on the other hand, the selector 251-1 selects ubit1 supplied from the flip-flop 231-1 of the upper branch.

Likewise, the selectors 251-2 through 251-29 each select the corresponding one of the 32 bits supplied from the cyclic shifting unit 213 or the corresponding one of the bits supplied from the flip-flops of the upper branch based on the corresponding one of the signals supplied from the flip-flops 271-2 through 271-29.

The RM decoder 215 performs RM decoding on the information of 32 bits in total, which consists of the 30 bits output from the selectors 251-0 through 251-29, and ubit30 and ubit31 output from the upper branch. As a result, 16-bit signaling data is output.

As described above, the reception states of all the bits of the upper branch are not compared with the reception states of all the bits of the lower branch, but 30 bits that do not need to be greatly delayed among the 32 bits are subjected to the reception state comparison before the position of the FEC Frame Header is detected. Accordingly, circuit size can be reduced.

Also, with the use of a hard-decision de-mapper in symbol de-mapping, the first through 30th bits of the upper branch or the lower branch, whichever is in the better reception state, can be selected.

Third Embodiment

Figure 8:
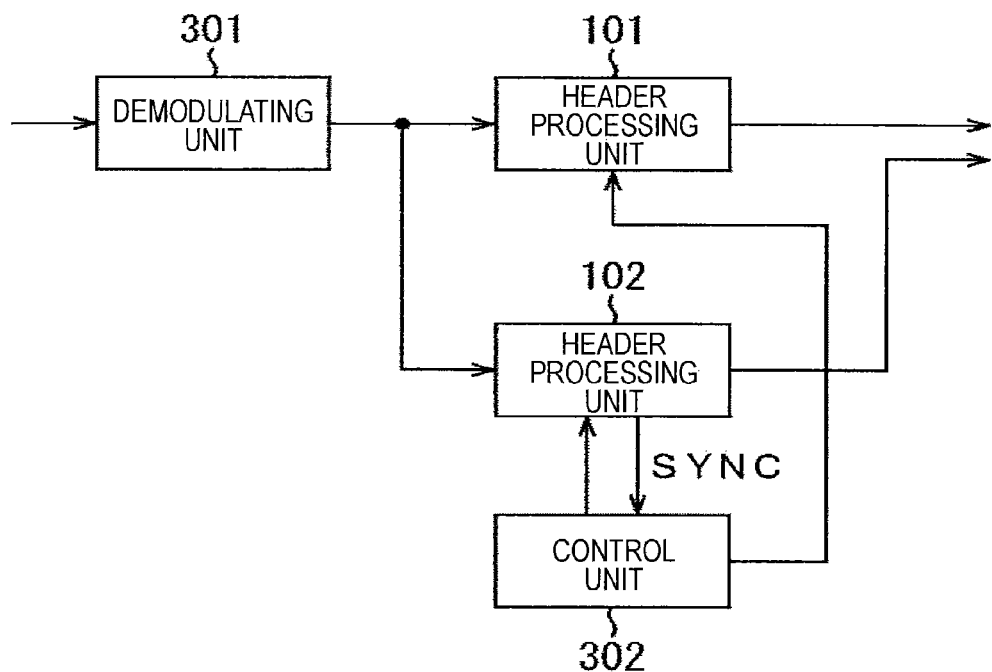
FIG. 8 is a diagram showing an example structure of a receiving device.

FIG. 8 is a diagram showing an example structure of a receiving device that includes the Header processing unit 101 shown in FIG. 5 and the Header processing unit 102 shown in FIG. 7.

The receiving device is formed with the Header processing unit 101, the Header processing unit 102, a demodulating unit 301, and a control unit 302. An OFDM signal compliant with DVB-C2 is input to the demodulating unit 301.

The demodulating unit 301 performs a demodulating operation such as demodulation or equalization on the OFDM signal compliant with DVB-C2, and outputs signals of symbols obtained through the demodulating operation and information indicating the reception states of the respective symbols to the Header processing unit 101 and the Header processing unit 102. Signals such as an input enable signal are also input from the demodulating unit 301 to the Header processing unit 101 and the Header processing unit 102, where appropriate.

Under the control of the control unit 302, the Header processing unit 101 processes the symbols of the Header portion in the manner described above with reference to FIG. 5 after synchronization is established (or after the position of the Header is detected). As a result, 16 signaling bits are output. The Header to be processed at the Header processing unit 101 is a Preamble Header or an FEC Frame Header having its position detected.

Under the control of the control unit 302, the Header processing unit 102 processes symbols in the manner described above with reference to FIG. 7 before synchronization is established (or before the position of the Header is detected). As a result, 16 signaling bits are output. The Header to be processed at the Header processing unit 102 is an FEC Frame Header having its position yet to be detected. When the position of the FEC Frame Header is detected, and synchronization is established, the Header processing unit 102 outputs a synchronization signal sync to the control unit 302.

The control unit 302 controls the Header processing unit 101 and the Header processing unit 102 to process symbols that are output from the demodulating unit 301.

Figure 9:
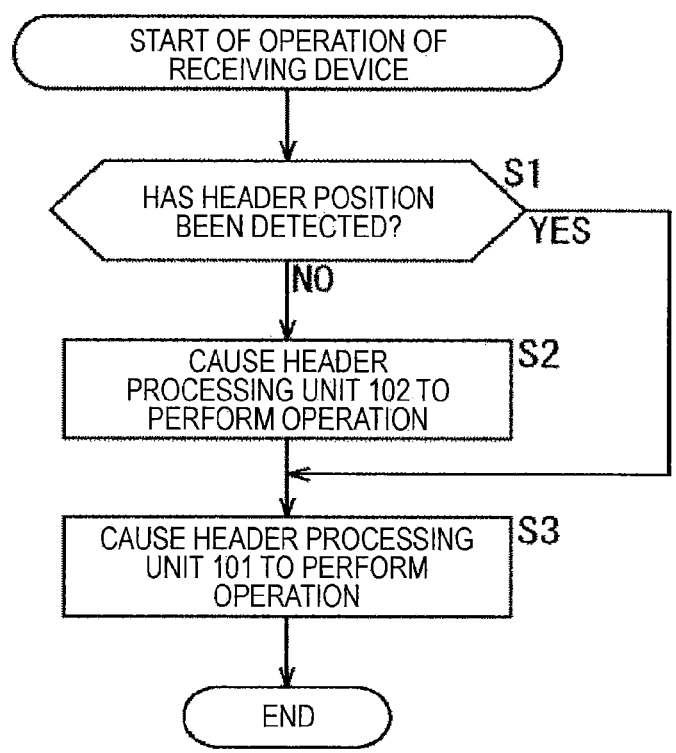
FIG. 9 is a flowchart for explaining an operation of the control unit.

Referring now to the flowchart shown in FIG. 9, an operation of the control unit 302 is described. The operation shown in FIG. 9 is performed when reception of an OFDM signal compliant with DVB-C2 is started.

In step S1, the control unit 302 determines whether the position of a Header has been detected. If it is determined in step S1 that the position of the Header has not been detected, the control unit 302 in step S2 causes the Header processing unit 102 to process the signals that are output from the demodulating unit 301. If the processing target Header is an FEC Frame Header, for example, the signals that are output from the demodulating unit 301 are processed by the Header processing unit 102.

On the other hand, if it is determined in step S1 that the position of the Header has been detected, the control unit 302 in step S3 causes the Header processing unit 101 to process the signals that are output from the demodulating unit 301. In a case where the processing target Header is a Preamble Header, and the position of the Preamble Header has been detected based on L1 information supplied from an error correcting unit or the like, the signals that are output from the demodulating unit 301 are processed by the Header processing unit 101.

In a case where synchronization is established by the Header processing unit 102 processing the symbols constituting the FEC Frame Header, the control unit 302 in step S3 also causes the Header processing unit 101 to process the signals output from the demodulating unit 301. Once the position of the FEC Frame Header is detected, the processing of the FEC Frame Header thereafter is performed by the Header processing unit 101.

As the Header processing unit 101 and the Header processing unit 102 are used in a switching manner, reception performance can be ensured while hard decisions are used in de-mapping of symbols, regardless of whether the processing target is a Preamble Header or an FEC Frame Header.

<Modifications>

In FIG. 7, only the 30 bits that do not need to be greatly delayed among the 32 bits are subjected to the reception performance comparison. However, all the 32 bits may be subjected to the reception performance comparison between the upper branch and the lower branch.

In the example illustrated in FIG. 8, the Header processing unit 101 having the structure shown in FIG. 5 and the Header processing unit 102 having the structure shown in FIG. 7 are provided independently of each other. However, only one structure may be provided, if the structure can be shared.

In the structure that can be shared, the operation described above with reference to FIG. 5 is performed before the position of a Header is detected, and the operation described above with reference to FIG. 7 is performed after the position of the Header is detected. For example, the function of the selector 114 shown in FIG. 5 and the functions of the selectors 251-0 through 251-29 shown in FIG. 7 may be realized by one selector.

Although cases where symbol signals generated by performing QPSK mapping have been described so far, the above described method of performing hard-decision de-mapping and selecting between the upper-branch signals and the lower-branch signals based on reception states can be applied in cases where symbol signals generated by performing mapping by some other method such as 16 QAM.

[Example Structure of a Receiving System]

Figure 10:
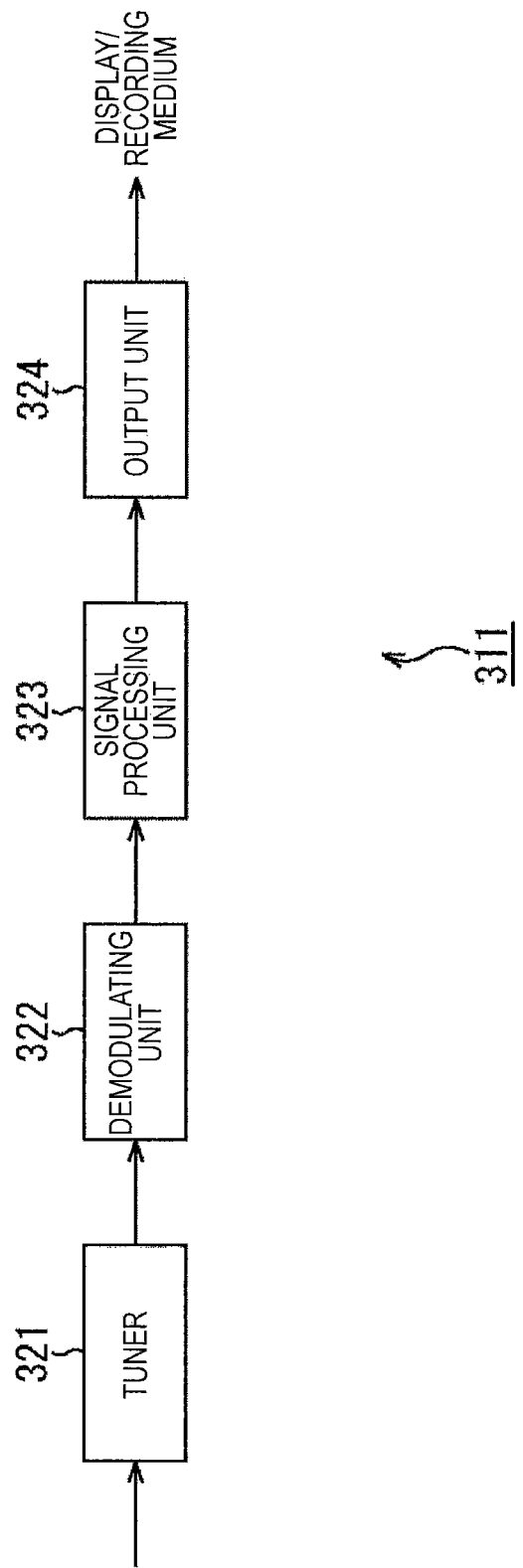
FIG. 10 is a block diagram showing an example structure of a receiving system.

FIG. 10 is a block diagram showing an example structure of a receiving system.

The receiving system 311 shown in FIG. 10 is formed with a tuner 321, a demodulating unit 322, a signal processing unit 323, and an output unit 324.

The tuner 321 receives a signal transmitted via a transmission channel of digital terrestrial broadcasting, digital satellite broadcasting, a CATV network, the Internet, or the like, and outputs the signal to the demodulating unit 322.

The demodulating unit 322 performs a channel decoding operation including a demodulating operation and an error correcting operation on the signal supplied from the tuner 321, and outputs the data obtained through the channel decoding operation to the signal processing unit 323. The above described demodulating unit 301 is included in the demodulating unit 322.

The signal processing unit 323 appropriately performs signal processing such as an expanding operation or a descrambling operation on the data obtained through the channel decoding operation, and acquires transmission target data. The above described Header processing unit 101 and Header processing unit 102 are included in the signal processing unit 323.

The expanding operation by the signal processing unit 323 is performed in a case where the transmission target data such as an image or sound has been compressed by using a predetermined method such as MPEG on the transmission side. A descrambling operation is performed in a case where scrambling has been performed on the transmission target data on the transmission side. The signal processing unit 323 outputs the transmission target data obtained by appropriately performing signal processing, to the output unit 324.

In a case where an image is displayed based on the data supplied from the signal processing unit 323, the output unit 324 performs an operation such as D-A conversion on the data supplied from the signal processing unit 323. The output unit 324 outputs the image signal obtained by performing an operation such as a D-A conversion to a display provided in the receiving system 311 or a display outside the receiving system 311, and causes the display to display the image.

In a case where the data supplied from the signal processing unit 323 is recorded on a recording medium, the output unit 324 outputs the data supplied from the signal processing unit 323 to a recording medium inside the receiving system 311 or an external recording medium to record the data. A recording medium is formed with a hard disk, a flash memory, an optical disk, or the like. An external recording medium may not be an external recording medium attached to the receiving system 311, but may be a recording medium connected via a network.

The receiving system 311 having the above described structure may be formed with hardware such as an IC (Integrated Circuit) chip, or may be formed with a component such as a board formed by arranging IC chips thereon, or may be formed with an independent device including such a component.

Each of the tuner 321, the demodulating unit 322, the signal processing unit 323, and the output unit 324 can be formed as an independent hardware or software module. Alternatively, a combination of two or more of the tuner 321, the demodulating unit 322, the signal processing unit 323, and the output unit 324 may be formed as an independent hardware or software module. For example, the tuner 321 and the demodulating unit 322 can be formed with a hardware module or the like, and the signal processing unit 323 and the output unit 324 can be formed with another hardware module or the like.

The receiving system 311 can be used in television sets that receive television broadcasts as digital broadcasting, radio receivers that receive radio broadcasts, and recorder devices that record television broadcasts, for example.

[Example Structure of a Computer]

The above described series of operations can be performed by hardware, and can also be performed by software. In a case where the series of operations are performed by software, the program of the software is installed from a program recording medium into a computer incorporated into special-purpose hardware or a general-purpose personal computer, for example.

Figure 11:
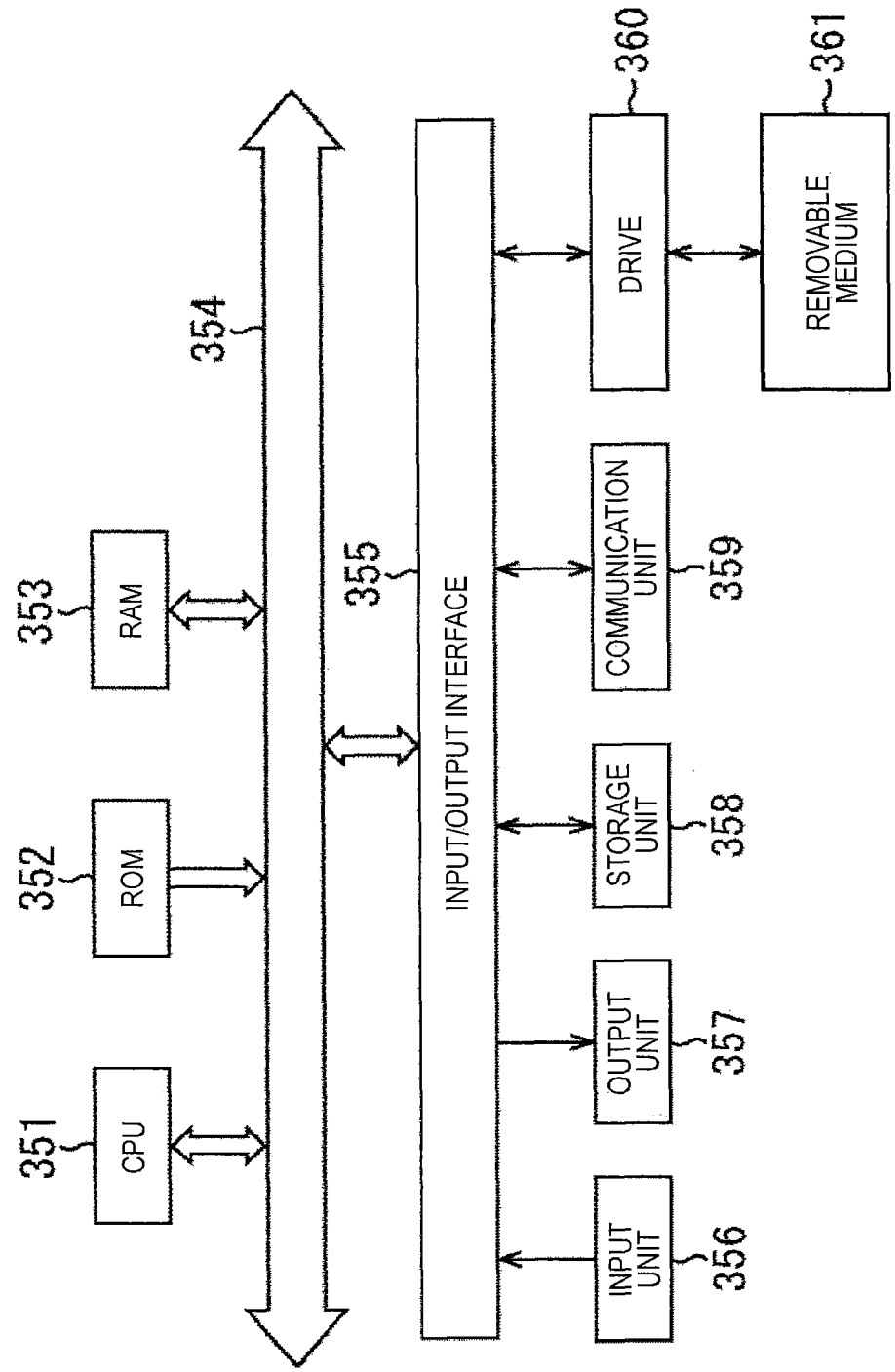
FIG. 11 is a block diagram showing an example structure of a computer.

FIG. 11 is a block diagram showing an example structure of the hardware of a computer that performs the above described series of operations in accordance with a program.

A CPU (Central Processing Unit) 351, a ROM (Read Only Memory) 352, a RAM (Random Access Memory) 353 are connected to one another by a bus 354.

An input/output interface 355 is further connected to the bus 354. An input unit 356 formed with a keyboard, a mouse, and the like, and an output unit 357 formed with a display, a speaker, and the like are connected to the input/output interface 355. A storage unit 358 formed with a hard disk, a nonvolatile memory, or the like, a communication unit 359 formed with a network interface or the like, and a drive 360 driving a removable medium 361 are also connected to the input/output interface 355.

In the computer having the above described structure, the CPU 351 loads a program stored in the storage unit 358 into the RAM 353 via the input/output interface 355 and the bus 354, for example, and executes the program, so that the above described series of operations are performed.

The program to be executed by the CPU 351 is recorded in the removable medium 361, for example, or is provided via wired or wireless transmission medium such as a local area network, the Internet, or digital broadcasting, and is installed into the storage unit 358.

The program to be executed by the computer may be a program for performing operations in chronological order in accordance with the sequence described in this specification, or may be a program for performing operations in parallel or performing an operation when necessary, such as when there is a call.

It should be noted that embodiments of the present technique are not limited to the above described embodiments, and various modifications may be made to them without departing from the scope of this technique.

[Example Combinations of Structures]

This technique may also be embodied in the following forms.

(1)

A receiving device including:

a de-mapping unit that receives a symbol signal generated by performing mapping on a first branch signal and a second branch signal indicating information about the same transmission target, and performs de-mapping on the symbol signal by a hard decision;

a selecting unit that selects, in accordance with a reception state, one signal from the first branch signal and the second branch signal obtained through the de-mapping; and a decoding unit that decodes the information about the transmission target based on the one signal.

(2)

The receiving device of (1), wherein the selecting unit selects the signal in the better reception state between the first branch signal and the second branch signal based on information indicating a reception state of the symbol signal.

(3)

The receiving device of (1) or (2), wherein the symbol signal is a signal of an FEC Frame Header or a Preamble Header compliant with DVB-C2.

(4)

The receiving device of any of (1) through (3), wherein cyclic shifting is performed on the second branch signal in a transmitting device that transmits the symbol signal, the receiving device further includes a cyclic shifting unit that performs cyclic shifting on the second branch signal obtained through the de-mapping, the cyclic shifting being performed in reverse order of the cyclic shifting order in the transmitting device, and the selecting unit selects the one signal from the second branch signal indicating predetermined bits excluding a bit located in a predetermined region starting from the top in the sequence after the cyclic shifting performed by the cyclic shifting unit, and the first branch signal indicating the predetermined bits, the predetermined bits being of a plurality of bits indicated by the second branch signal obtained through the de-mapping.

(5)

The receiving device of (4), wherein the selecting unit selects the first branch signal as the one signal indicating the bit located in the predetermined region.

(6)

The receiving device of (4) or (5), wherein the symbol signal is a signal of an FEC Frame Header compliant with DVB-C2, and the selecting unit, before the position of the FEC Frame Header is detected, selects the one signal from the first branch signal and the second branch signal indicating the predetermined bits, and, after the position of the FEC Frame Header is detected, selects the one signal from the first branch signal and the second branch signal indicating the plurality of bits.

(7)

A receiving method including the steps of:

receiving a symbol signal generated by performing mapping on a first branch signal and a second branch signal indicating information about the same transmission target, and performing de-mapping on the symbol signal by a hard decision;

selecting, in accordance with a reception state, one signal from the first branch signal and the second branch signal obtained through the de-mapping; and decoding the information about the transmission target based on the one signal.

(8)

A program for causing a computer to perform an operation including the steps of:

receiving a symbol signal generated by performing mapping on a first branch signal and a second branch signal indicating information about the same transmission target, and performing de-mapping on the symbol signal by a hard decision;

selecting, in accordance with a reception state, one signal from the first branch signal and the second branch signal obtained through the de-mapping; and decoding the information about the transmission target based on the one signal.

(9)

A receiving system including:

a receiving unit that receives a signal transmitted via a transmission channel;

a demodulating unit that performs a demodulating operation on the signal received by the receiving unit;

a signal processing unit that performs signal processing on data demodulated by the demodulating unit, and acquires transmission target data; and an output unit that outputs the transmission target data acquired by the signal processing unit, the signal processing unit including:

a de-mapping unit that receives a symbol signal generated by performing mapping on a first branch signal and a second branch signal indicating information about the same transmission target, and performs de-mapping on the symbol signal by a hard decision;

a selecting unit that selects, in accordance with a reception state, one signal from the first branch signal and the second branch signal obtained through the de-mapping; and a decoding unit that decodes the information about the transmission target based on the one signal.

REFERENCE SIGNS LIST

101, 102 Header processing unit, 111 QPSK de-mapper, 112 Descrambling unit, 114 Selector, 115 RM decoder, 121 Controller, 122 through 125 Flip-flops, 141, 142 Flip-flops, 143 Comparing unit, 144, 145 Flip-flops, 146 Selector, 151-0 through 151-30 Flip-flops

The invention claimed is:

1. A receiving device comprising:

a de-mapping unit configured to receive a symbol signal generated by performing mapping on a first branch signal and a second branch signal indicating information about a transmission target, and perform de-mapping on the symbol signal by a hard decision;

a selecting unit configured to receive the first branch signal and the second branch signal, and to receive a reception state signal from a comparing unit, the selecting unit providing a selected signal by selecting either the first branch signal or the second branch signal depending upon the reception state signal;

a decoding unit configured to decode the information about the transmission target based on the selected signal;

a cyclic shifting unit configured to perform cyclic shifting on the second branch signal obtained through the de-mapping, the cyclic shifting being performed in reverse order of cyclic shifting order in a transmitting device, and the selecting unit selects a signal from the second branch signal indicating predetermined bits excluding a bit located in a predetermined region starting from a beginning of a sequence after the cyclic shifting performed by the cyclic shifting unit, and the first branch signal indicating the predetermined bits, the predetermined bits being of a plurality of bits indicated by the second branch signal obtained through the de-mapping, wherein the cyclic shifting is performed on the second branch signal in the transmitting device that transmits the symbol signal.

2. The receiving device according to claim 1, wherein the symbol signal is a signal of one of a Forward Error Correction Frame Header and a Preamble Header compliant with Digital Video Broadcasting for Cable 2.

3. The receiving device according to claim 1, wherein the selecting unit selects the first branch signal as a signal indicating the bit located in the predetermined region.

4. The receiving device according to claim 1, wherein the symbol signal is a signal of the Forward Error Correction Frame Header compliant with Digital Video Broadcasting for Cable 2, and the selecting unit, before a position of the Forward Error Correction Frame Header is detected, selects a signal from the first branch signal and the second branch signal indicating the predetermined bits, and after the position of the Forward Error Correction Frame Header is detected, selects a signal from the first branch signal and the second branch signal indicating the plurality of bits.

5. A receiving method comprising the steps of:

receiving a symbol signal generated by performing mapping on a first branch signal and a second branch signal indicating information about a same transmission target, and performing de-mapping on the symbol signal by a hard decision;

receiving the first branch signal, the second branch signal, and a reception state signal from a comparing unit and selecting either the first branch signal or the second branch signal depending upon the reception state signal;

decoding the information about the transmission target based on the selected signal;

performing cyclic shifting on the second branch signal obtained through the de-mapping, the cyclic shifting being performed in reverse order of cyclic shifting order in a transmitting device, and selecting a signal from the second branch signal indicating predetermined bits excluding a bit located in a predetermined region starting from a beginning of a sequence after the cyclic shifting performed by the cyclic shifting unit, and the first branch signal indicating the predetermined bits, the predetermined bits being of a plurality of bits indicated by the second branch signal obtained through the de-mapping, wherein the cyclic shifting is performed on the second branch signal in the transmitting device that transmits the symbol signal.

6. The receiving method according to claim 5, wherein the symbol signal is a signal of one of a Forward Error Correction Frame Header and a Preamble Header compliant with Digital Video Broadcasting for Cable 2.

7. The receiving method according to claim 5, wherein the selecting unit selects the first branch signal as a signal indicating the bit located in the predetermined region.

8. The receiving method according to claim 5, wherein the symbol signal is a signal of the Forward Error Correction Frame Header compliant with Digital Video Broadcasting for Cable 2, and the selecting unit, before a position of the Forward Error Correction Frame Header is detected, selects a signal from the first branch signal and the second branch signal indicating the predetermined bits, and, after the position of the Forward Error Correction Frame Header is detected, selects a signal from the first branch signal and the second branch signal indicating the plurality of bits.

9. A non-transitory computer readable medium storing program code being executable by a processor of a device to perform operations comprising:

receiving a symbol signal generated by performing mapping on a first branch signal and a second branch signal indicating information about a same transmission target, and performing de-mapping on the symbol signal by a hard decision;

receiving the first branch signal, the second branch signal, and a reception state signal from a comparing unit and selecting either the first branch signal or the second branch signal depending upon the reception state signal;

decoding the information about the transmission target based on the selected signal;

performing cyclic shifting on the second branch signal obtained through the de-mapping, the cyclic shifting being performed in reverse order of cyclic shifting order in a transmitting device, and selecting a signal from the second branch signal indicating predetermined bits excluding a bit located in a predetermined region starting from a beginning of a sequence after the cyclic shifting is performed, and the first branch signal indicating the predetermined bits, the predetermined bits being of a plurality of bits indicated by the second branch signal obtained through the de-mapping, wherein the cyclic shifting is performed on the second branch signal in the transmitting device that transmits the symbol signal.

10. The non-transitory computer readable medium of claim 9, wherein the symbol signal is a signal of one of a Forward Error Correction Frame Header and a Preamble Header compliant with Digital Video Broadcasting for Cable 2.

11. The non-transitory computer readable medium of claim 9, wherein the selecting unit selects the first branch signal as the signal indicating the bit located in the predetermined region.

12. A receiving system comprising:

a receiving unit configured to receive a signal transmitted via a transmission channel;

a demodulating unit configured to perform a demodulating operation on the signal received by the receiving unit;

a signal processing unit configured to perform signal processing on data demodulated by the demodulating unit, and acquire transmission target data; and an output unit configured to output the transmission target data acquired by the signal processing unit, the signal processing unit including:

a de-mapping unit configured to receive a symbol signal generated by performing mapping on a first branch signal and a second branch signal indicating information about a transmission target, and perform de-mapping on the symbol signal by a hard decision;

a selecting unit configured to receive the first branch signal and the second branch signal, and to receive a reception state signal from a comparing unit, the selecting unit providing a selected signal by selecting either the first branch signal or the second branch signal depending upon the reception state signal;

a decoding unit configured to decode the information about the transmission target based on the selected signal;

a cyclic shifting unit configured to perform cyclic shifting on the second branch signal obtained through the de-mapping, the cyclic shifting being performed in reverse order of cyclic shifting order in a transmitting device, and the selecting unit selects a signal from the second branch signal indicating predetermined bits excluding a bit located in a predetermined region starting from a beginning of a sequence after the cyclic shifting is performed, and the first branch signal indicating the predetermined bits, the predetermined bits being of a plurality of bits indicated by the second branch signal obtained through the de-mapping, wherein the cyclic shifting is performed on the second branch signal in the transmitting device that transmits the symbol signal.

13. The receiving system according to claim 12, wherein the symbol signal is a signal of one of a Forward Error Correction Frame Header and a Preamble Header compliant with Digital Video Broadcasting for Cable 2.

14. The receiving system according to claim 12, wherein the selecting unit selects the first branch signal as a signal indicating the bit located in the predetermined region.

15. The receiving system according to claim 12, wherein the symbol signal is a signal of a Forward Error Correction Frame Header compliant with Digital Video Broadcasting for Cable 2, and the selecting unit, before a position of the Forward Error Correction Frame Header is detected, selects a signal from the first branch signal and the second branch signal indicating the predetermined bits, and, after the position of the Forward Error Correction Frame Header is detected, selects a signal from the first branch signal and the second branch signal indicating the plurality of bits.

* * * * *